United States Patent
Kujawski

Patent Number: 5,700,040
Date of Patent: Dec. 23, 1997

[54] FLUID QUICK CONNECTOR

[75] Inventor: Rick A. Kujawski, Macomb, Mich.

[73] Assignee: Bundy Corporation, Warren, Mich.

[21] Appl. No.: 392,498

[22] Filed: Feb. 23, 1995

[51] Int. Cl.⁶ .................................................. F16L 39/00
[52] U.S. Cl. .................................................. 285/319
[58] Field of Search .................... 285/319, 320, 285/921, 315, 305

[56] References Cited

U.S. PATENT DOCUMENTS

| | | |
|---|---|---|
| 574,236 | 12/1896 | Blackburn .................. 285/320 X |
| 3,453,005 | 7/1969 | Foults . |
| 3,480,300 | 11/1969 | Jeffery et al. . |
| 3,711,125 | 1/1973 | Dehar . |
| 4,035,005 | 7/1977 | DeVincent et al. . |
| 4,068,870 | 1/1978 | Whitney et al. ................. 285/320 |
| 4,725,081 | 2/1988 | Bauer . |
| 4,730,856 | 3/1988 | Washizu . |
| 4,743,051 | 5/1988 | Proni . |
| 4,756,558 | 7/1988 | Beamer . |
| 4,781,400 | 11/1988 | Cunningham . |
| 4,802,697 | 2/1989 | Bartholomew . |
| 4,929,002 | 5/1990 | Sauer . |
| 4,964,658 | 10/1990 | Usui et al. . |
| 5,067,754 | 11/1991 | Bartholomew . |
| 5,069,424 | 12/1991 | Dennany, Jr. et al. . |
| 5,161,830 | 11/1992 | Abe . |
| 5,193,857 | 3/1993 | Khamura ..................... 285/319 |
| 5,195,787 | 3/1993 | Bartholomew . |
| 5,211,085 | 5/1993 | Busch et al. ................. 285/319 X |
| 5,228,728 | 7/1993 | McNaughton et al. ......... 285/319 |
| 5,261,709 | 11/1993 | McNaughton et al. ......... 285/319 |
| 5,303,963 | 4/1994 | McNaughton et al. . |
| 5,324,080 | 6/1994 | McNaughton et al. . |
| 5,324,081 | 6/1994 | Umezawa . |

FOREIGN PATENT DOCUMENTS 138386  5/1930  Switzerland ..................... 285/320

*Primary Examiner*—Terry Lee Melius
*Assistant Examiner*—Heather Shackelford
*Attorney, Agent, or Firm*—Dorn, McEachran, Jambor & Keating

[57] ABSTRACT

A quick connector coupling for forming a joint in a fluid line includes a hollow plastic connector body extending between a male member connection end and a hose connection end. A male member received in the connector body and has an enlarged annular upset. A retainer is associated with the connector body and secures the male member in the connector body. The retainer has one or two locking loops which extend beyond the male member connection end and encircle a portion of the upset to prevent withdrawl of the male member. The retainer may be attached to the interior or exterior of the connector body, and may be made of plastic or metal.

10 Claims, 3 Drawing Sheets

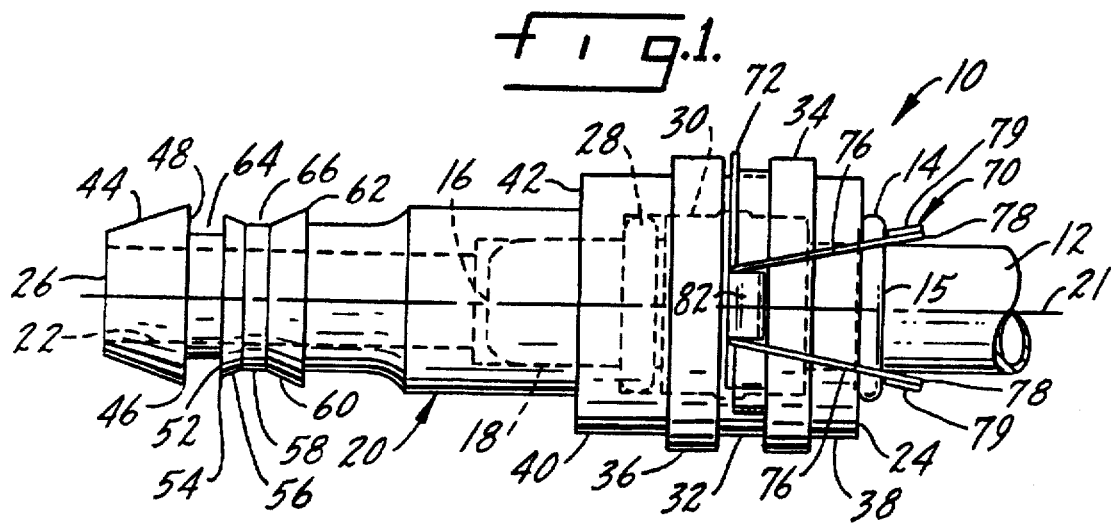
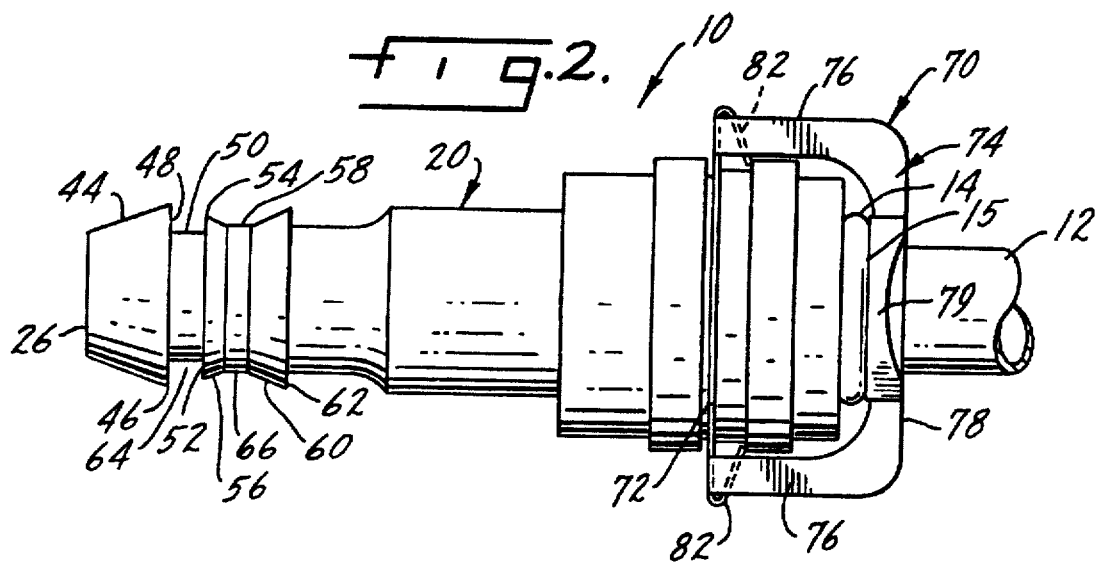
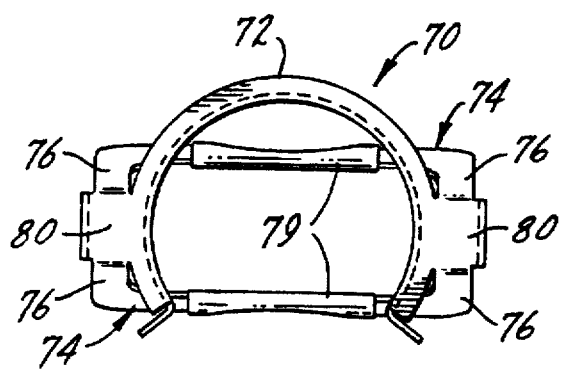
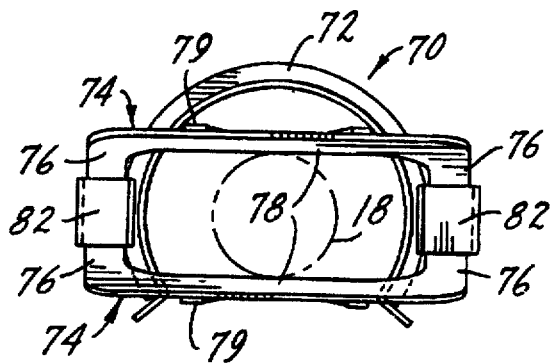

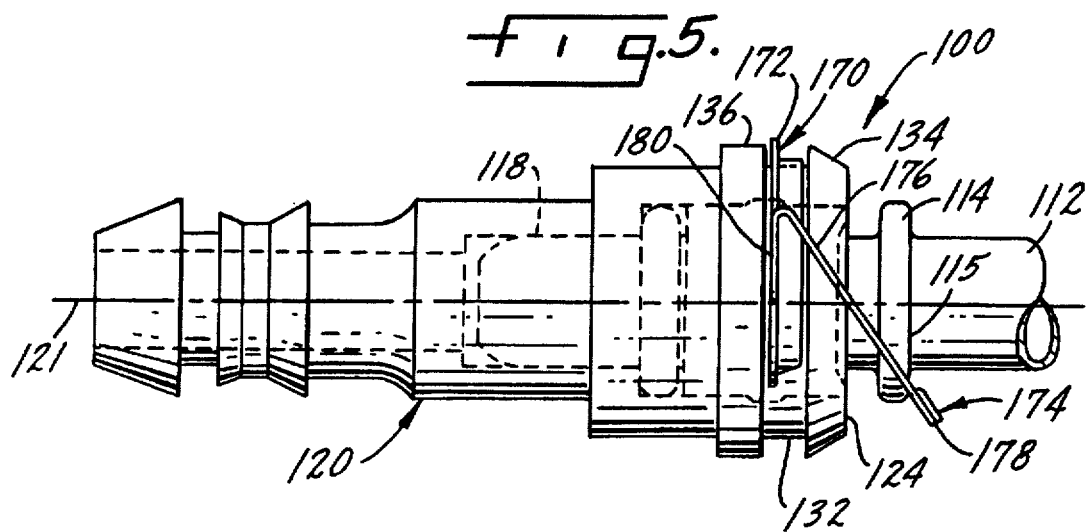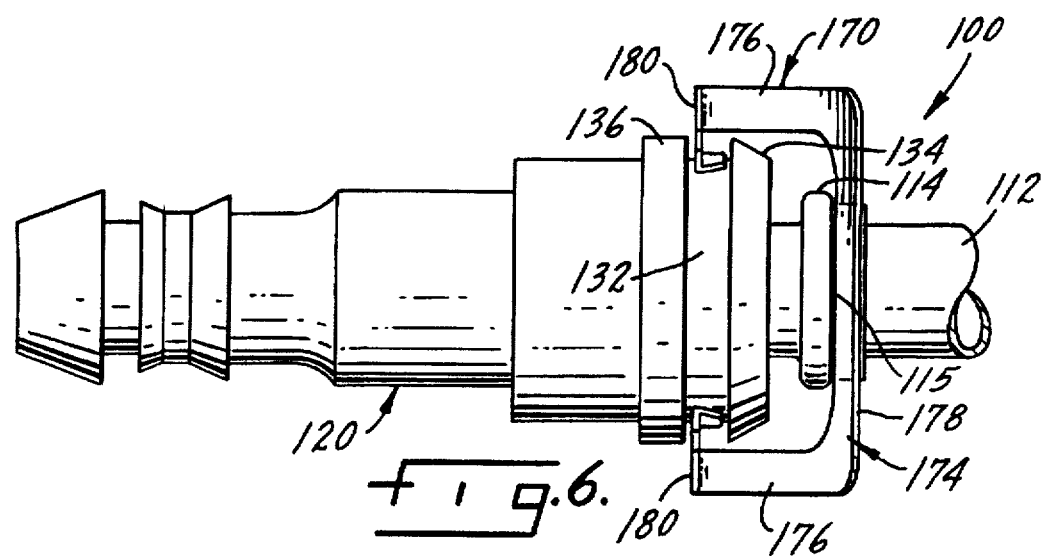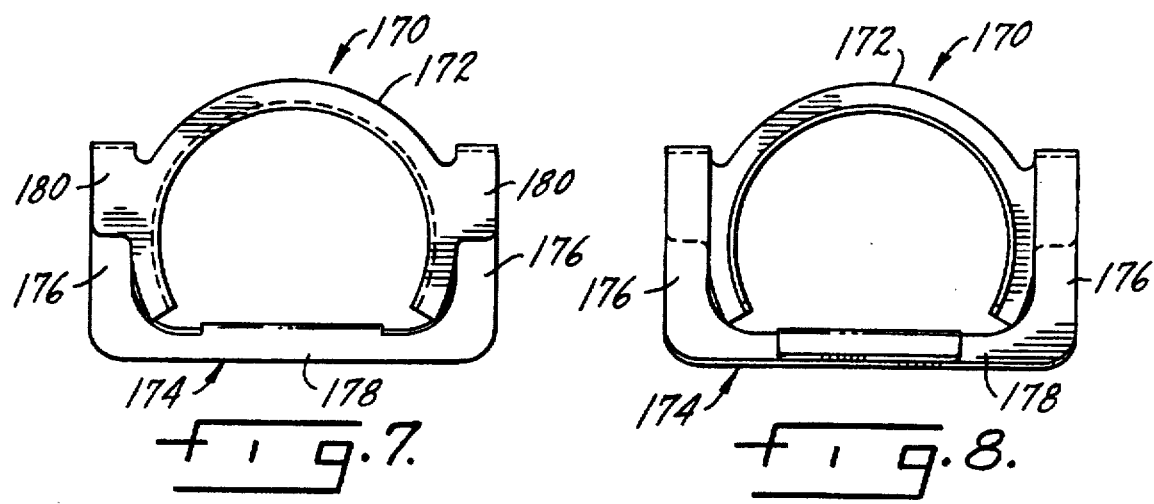

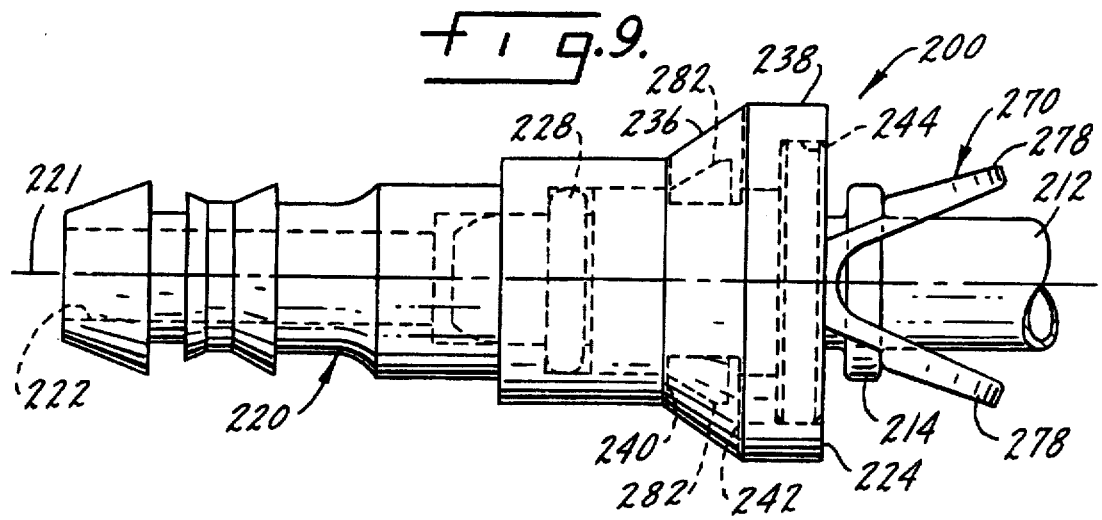
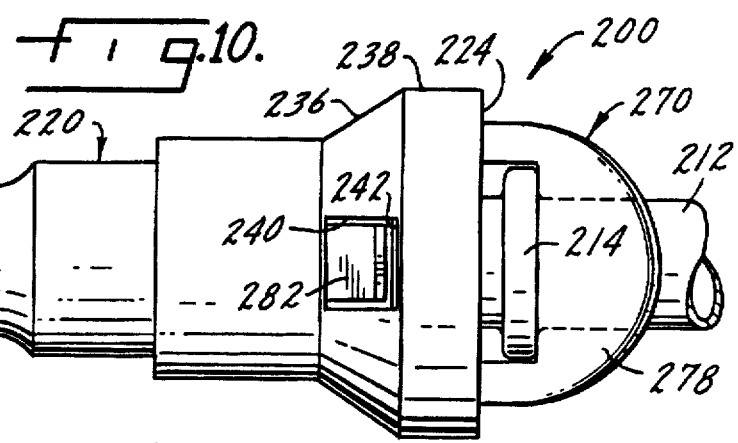
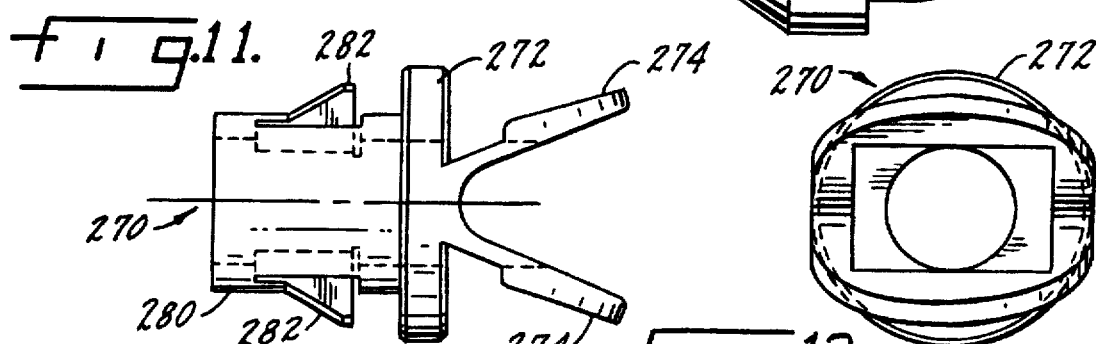
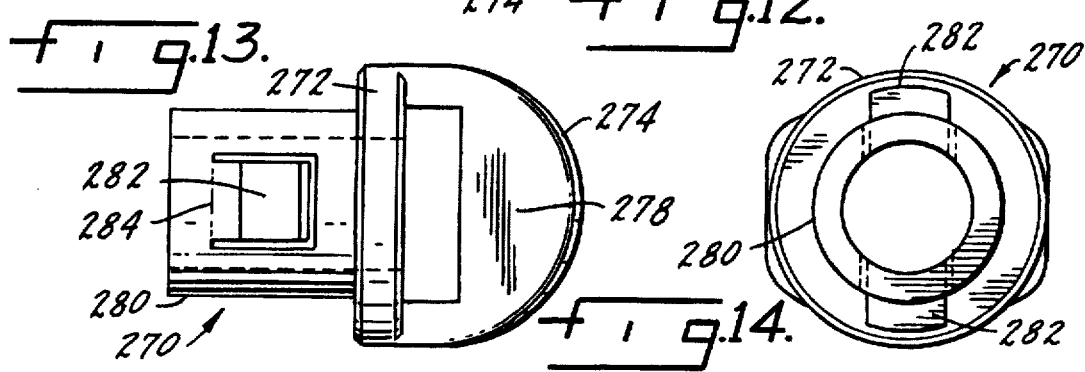

FLUID QUICK CONNECTOR

BACKGROUND OF THE INVENTION

This invention relates to fluid line systems which include quick connector couplings, and more particularly to a novel retainer and connector body arrangement for releasably securing the male and female portions of the coupling together.

In automotive and other fields, quick connector couplings, which generally include a male member received and sealingly retained in a female connector body, are often utilized to provide a fluid connection between two components or conduits, thus establishing a fluid line between the two components. Use of quick connector couplings is advantageous in that a sealed and secured fluid line may be established with a minimum amount of time and expense.

A retainer structure, usually associated with the female connector body, secures the male member in the connector body. One favored arrangement is a retainer disposed within the conector body. The retainer typically includes compression beams which extend between a radial upset formed on the male member and a radial face defined in the connector body, preventing withdrawl of the male member from the connector body. While this arrangement has proven to be quite effective, one constantly strives to improve the state of the art and to develop alternative designs.

One area in which there is much room for improvement in quick connector design are applications involving fluid lines carrying high pressure or temperature fluid. Many quick connector/retainer designs that would function effectively under low pressure conditions break down under high pressure conditions. Similar concerns are present with high temperature lines. A need exists for a quick connector exhibiting increased reliability under a wide range of conditions, without increased cost or complexity.

Another problem encountered in quick connector design is that of material composition. Various environmental factors, such as temperature, pressure and fluid composition, may dictate the use of a particular material in the coupling. Plastic, for example, is well-suited to low pressure applications and offers superior corrosion and chemical resistance. Metal, conversely, exhibits better performance at elevated temperatures and increased retention capability.

Many designs are limited in that they must be manufactured from one particular material, either metal or plastic. Thus, the design may be usable only in applications having favorable environmental factors. A quick connector design convertable between metal and plastic would be much more versatile. Furthermore, a design allowing use of a combination of plastic and metal may be desirable to take advantage of the properties of each material.

SUMMARY OF THE INVENTION

The present invention provides a quick connector coupling exhibiting increased reliability over a wide range of pressure and temperature conditions, and having a basic design that is convertable between plastic or metal, or a combination of the two materials.

The quick connector coupling includes a hollow female connector body extending between a male member connection end and a hose connection end. A male member is received in the connector body and has an enlarged annular upset. A retainer associated with the connector body secures the male member in the connector body. The retainer includes at least one locking loop extending beyond the male member connection end and encircling a portion of the upset.

In one embodiment of the invention, the retainer is stamped from sheet metal. The connector body, which is made of plastic, includes an annular groove formed in its exterior surface. The retainer includes a semi-circular base which is disposed in the groove to secure the retainer to the connector body. One or two locking loops extend from the base beyond the male member connection end of the connector body.

In another embodiment of the invention, both the retainer and connector body are formed from plastic. Locking tabs are formed on a spacer sleeve which extends into the connector body from an annular base. The locking tabs engage a locking surface defined in the connector body to secure the retainer to the connector body. The locking loops extend out of the connector body from the annular base.

BRIEF DESCRIPTION OF THE DRAWINGS

FIG. 1 is a side view of a first embodiment of a quick connector coupling according to the present invention;

FIG. 2 is a top plan view of the coupling of FIG. 1;

FIG. 3 is a rear end view of the retainer illustrated in FIG. 1;

FIG. 4 is a front end view of the retainer of FIG. 3;

FIG. 5 is a side view of a second embodiment of a quick connector coupling according to the present invention;

FIG. 6 is a bottom plan view of the coupling of FIG. 5;

FIG. 7 is a rear end view of the retainer illustrated in FIG. 5;

FIG. 8 is a front end view of the retainer of FIG. 7;

FIG. 9 is a side view of a third embodiment of a quick connector coupling according to the present invention; and FIG. 10 is a top plan view of the coupling of FIG. 9;

FIG. 11 is a side view of the retainer illustrated in FIG. 9;

FIG. 12 is a front end view of the retainer of FIG. 11;

FIG. 13 is a top plan view of the retainer of FIG. 11; and

FIG. 14 is a rear end view of the retainer of FIG. 11.

DETAILED DESCRIPTION OF THE PREFERRED EMBODIMENTS

A first embodiment of the present invention is illustrated in FIGS. 1–4. Quick connector coupling 10 includes a male member 12 connectable with a hollow female connector body 20 to form a permanent, but severable joint in a fluid line system.

Male member 12 is formed at an end of a hollow, rigid tube which forms a part of a fluid line system. The tube on which male member 12 is formed may lead to a component in a fluid line system, or may itself be a component in a fluid line system. Male member 12 includes an annular flange or upset 14 formed a given distance from an open end 16. Upset 14 defines an annular locking face 15. End 16 is rounded or tapered to facilitate insertion of male member 12 into connector body 20. A smooth, cylindrical sealing surface 18 extends between upset 14 and tube end 16. The outer diameter of sealing surface 18 is such that male member 12 fits snugly within connector body 20.

Female connector body 20 is hollow and defines a fluid chamber 22 extending between a male member connection end 24 and a hose connection end 26. Connector body 20 is made of molded plastic, with polyamide 12 being a preferred plastic material. An O-ring 28 and spacer 30 (depicted in hidden lines) are housed within an enlarged section of fluid chamber 22. Spacer 30 is hollow and is press-fit into chamber 22. O-ring 28 is secured in place by spacer 30 and forms a fluid seal between sealing surface 18 of male member 12 and an interior wall of connector body 20. If desired, more than one O-ring could be utilized.

The exterior of connector body 20 has a generally cylindrical, stepped configuration. Adjacent male member connection end 24, connector body 20 has an enlarged exterior diameter in accomodation of O-ring 28 and spacer 30. A groove 32 encircles body 20 between two raised ribs 34 and 36. On the other sides of the ribs, cylindrical rim 38 extends from rib 34 to male member connection end 24, and cylindrical surface 40 extends from rib 36 to a step 42. The portion of fluid chamber 22 adjacent, or underneath, rim 38 is of slightly enlarged diameter relative to the rest of chamber 22, permitting upset 14 of male member 12 to pass a short distance into connector body 20.

Adjacent hose connection end 26, connector body 20 has a reduced exterior diameter (relative to male member connection end 24). The exterior surface at this end is configured to facilitate connection to a flexible, typically rubber, hose. This end is often referred to as the "stem" of the connector body.

The stem includes a conical nose 44 which extends from end 26 to a first barb corner 46. A shoulder 48 drops from barb corner 46 to cylindrical surface 50. Surface 50 extends a short distance to a second shoulder 52 which faces shoulder 48. A second barb corner 54 is defined atop shoulder 52. Barb corner 54 is of reduced diameter relative to barb corner 46. Ramp 56 slopes down from barb corner 54 to a cylindrical surface 58. Surface 58 is slightly raised relative to surface 50. At the other end of surface 58, a ramp 60 leads up to a third, and final barb corner 62. The diameter of barb corner 62 is approximately the same as that of first barb corner 46.

The barbed configuration of the stem, in addition to providing means for retaining a hose on the stem, defines two potential grooves for housing exterior O-rings. A first groove 64 is defined by shoulders 48 and 52 and surface 50. A second groove 66 is defined by ramps 56 and 60 and surface 58. Groove 66 is slightly raised relative to groove 64, and is also defined by two ramped surfaces rather than two right surfaces. Seating an O-ring in either, or both, of these grooves, while not necessary, may be desirable to provide an enhanced seal between the connector body stem and hose.

A retainer 70 is connected to male member connection end 24. Retainer 70 is stamped from a strip of sheet metal, such as stainless steel, and is comprised of a semi-circular base 72 from which two locking loops 74 extend. Base 72 is snap-fit into exterior groove 32. Its semi-circular shape facilitates installation, through slight expansion, into groove 32. Once base 72 is moved into groove 32, retainer 70 is fixed axially, but freely rotatable relative to, connector body 20. Base 72 could be a complete circle, but assembly onto connector body 20 would become a more difficult proposition.

Locking loops 74 extend from base 72 towards male member connection end 24. Each loop 74 includes two legs 76 which extend beyond end 24, and a locking wedge 78 connecting the ends of legs 76 remote from base 72. A reinforcement strip 79 is attached to a central portion of wedge 78. Legs 76 are attached to the sides of two raised sections 80 of base 72. Sections 80 rise from base 72 and may include folded or bent-over portions 82. Sections 80 are spaced in one-hundred eighty degree opposition around base 72. Thus, to adequately support sections 80, base 72 must extend circumferentially beyond sections 80 (see FIG. 1).

Retainer legs 76 extend away from base 72 at an angle, each leg diverging from central axis 21 of connector body 20. Thus, the ends of loops 74 adjacent base 72 are radially closer to each other than are the ends of loops 74 remote adjacent wedges 78. The radial spacing between locking wedges 78 should be greater than the diameter of sealing surface 18 of male member 12, but less than the diameter of upset 14.

Since the spacing between wedges 78 is greater than the diameter of sealing surface 18, retainer 70 poses no initial resistance to male member insertion. Resistance occurs when wedges 78, which have a radial spacing less than the diameter of upset 14, contact upset 14. Since locking loops 74 are flexible and angled, impartment of sufficient inward force to male member 12 causes loops 74 to cam outward, permitting upset 14 to move inward of wedges 78. Once this occurs, loops 74 relax to their original state and wedges 78 "snap" into place behind upset 14. Wedges 78 contact locking face 15 defined by upset 14 to prevent subsequent withdrawl of male member 12 from connector body 20. Male member 12 is in a locked position. Reinforcement strips 79 strengthen wedges 78 and enhance their retention ability.

In the locked position, O-ring 28 forms a fluid seal between sealing surface 18 of male member 12 and the interior surface of connector body 20. Male member 12 may have a slight range of axial movement relative to connector body 20, since the portion of fluid chamber 22 underneath rim 38 is enlarged to permit entry of upset 14. Two factors affect the range of axial movement of male member 12: the axial spacing of wedges 78 from connection end 24, and the axial length of the enlarged portion of fluid chamber 22. These two factors may be adjusted to allow more axial movement of male member 12, or if desired, no axial movement of male member 12.

Release of male member 12 from connector body 20 is effected by spreading loops 74 until wedges 78 have a greater radial spacing than the diameter of upset 14. Male member 12 can then be withdrawn without resistance. Loops 74 may be spread manually or through use of a suitable tool.

The combination of a connector body made of plastic, and a retainer made of metal, as described above, provides several advantages. The plastic connector body offers corrosion and chemical resistance, while the metal retainer offers superior performance at elevated temperatures and pressures. Thus, the coupling may be used over a wide temperature and pressure range.

A second embodiment of the present invention is illustrated in FIGS. 5–8. Quick connector coupling 100 includes a male member 112 secured in a hollow female connector body 120.

The second embodiment coupling 100 is quite similar to the first embodiment coupling 10. The barb configuration at the stem end of the connector, for example, is the same. As in connector 10, a spacer and O-ring are contained within connector body 120. The principal difference is that one, rather than two, locking loops are utilized. The description of the second embodiment will focus on this difference.

A groove 132 is defined in the exterior of connector body 120 between two ribs 134 and 136. Connector body 120 has a shorter axial length then connector body 20. Rib 134 has a conical shape and tapers down to terminate at male member connection end 124. An extended rim is not provided between rib 134 and connection end 124.

Retainer 170 is attached to connection end 124 of connector body 120 and consists of one locking loop 174 extending from a semi-circular base 172. Like retainer 70, retainer 170 is stamped from a strip of sheet metal. Since it has only one locking loop, however, the stamping pattern of retainer 170 is simpler and consumes less material than that of retainer 70.

Base 172 is snap-fit into exterior groove 132. Locking loop 174 extends towards male member connection end 124, and includes two legs 176 extending beyond end 124, and a locking wedge 178 connecting the ends of legs 176 remote from base 172. A reinforcement may be attached to a central portion of wedge 178. Legs 176 are attached to the sides of two raised sections 180 of base 172.

Locking loop 174 extends from base 172 at an angle. Instead of diverging from central axis 121, however, loop 174 cuts across axis 121. Wedge 178 poses no resistance to entry of sealing surface 118 of male member 112, but resists entry of upset 114. Again, impartment of sufficient inward force to male member 112 causes loop 174 to cam outward, permitting upset 114 to move inward of wedge 178. Once this occurs, loop 174 relaxes to its original state and wedge 178 snaps into place behind upset 114. Wedge 178 contacts locking face 115 defined by upset 114 to prevent subsequent withdrawl of male member 112 from connector body 120.

Cutting loop 174 across axis 121 evens out the distribution of loads created by pull-apart forces exerted on male member 112. Loop 174 is attached to base 172 on one side of axis 121, and wedge 178 is disposed on the other side of axis 121. Thus, forces are distributed on both sides of axis 121. If loop 174 were configured as the individual loops 74 in connector 10 are configured, an imbalanced force distribution would result. All loads would be concentrated on one side of the connector body. Such an imbalance would likely lead to a breach of joint integrity.

A third embodiment of the present invention is illustrated in FIGS. 9–14. Coupling 200 includes a male member 212 secured within a female connector body 220. The third embodiment utilizes the basic configuration of the first embodiment, but has variations which are particularly suited to use of a plastic, rather than a metal, retainer.

Coupling 200 utilizes the same barb configuration at its stem end as do the first two embodiment couplings. The differences occur in the retainer design and in the connector body design at the male member connection end.

Connector body 220 has an enlarged portion adjacent male member connection end 224 defined by a conical, or ramped surface 236 and a rim 238. Slots 240 are formed through ramped surface 236 to define opposed locking surfaces 242. Fluid chamber 222 extending through connector body 220 is stepped adjacent connection end 224, defining an annular pocket 244.

Retainer 270 is made of plastic and is comprised of a circular base 272, two locking loops 274, and a spacer sleeve 280. Base 272 is nested in pocket 244 at the entrance to fluid chamber 222. It is hollow to allow passage of male member 212. Extending into chamber 222 from base 222 is hollow spacer sleeve 280. Sleeve 280 serves the dual functions of latching retainer 270 to connector body 220, and securing O-ring 228 within fluid chamber 222.

Two locking tabs 282 extend at an angle from opposite sides of sleeve 280. Tabs 282 engage locking surfaces 242 to lock retainer 270 into place relative to connector body 220. Tabs 282 are radially flexible about a hinge 284, facilitating insertion and removal of retainer 270 into and from connector body 220.

Locking loops 274 extend from base 272 at an angle out of connector body 220, defining locking wedges 278. Each loop diverges from central axis 221 of connector body 220.

Loops 274 lock male member 212 in connector body 220 in the same manner as in the first coupling embodiment. Upset 214 cams loops 274 out of its path, after which the loops snap into place behind the upset, with wedges 278 contacting upset 214 to prevent disconnection of the joint.

The third embodiment of the present invention, which utilizes a plastic, rather than metal, retainer, is particularly suited to lower pressure or lower temperature applications where high retention forces and temperatures are not normally encountered. In higher pressure or temperature applications, the first two embodiments would be preferred.

Various features of the present invention have been explained with reference to the embodiments shown and described. It must be understood, however, that modification may be made without departing from the spirit and scope of the invention.

I claim:

1. A quick connector coupling comprising:
 a hollow female connector body extending between a male member connection end and a hose connection end and including an annular groove formed in an exterior surface; a male member received in said connector body and having an enlarged annular upset; a retainer associated with said connector body and securing said male member in said connector body, said retainer including a semi-circular base disposed in said groove to secure said retainer to said connector body and at least one locking loop extending from said base and beyond said male member connection end and encircling a portion of said upset.

2. A coupling as claimed in claim 1, wherein there are two locking loops.

3. A coupling as claimed in claim 2, wherein said locking loops are disposed on opposite sides of a central axis passing through said connector body, said locking loops diverging at an angle from said axis.

4. A coupling as claimed in claim 3, wherein said locking loops extend from raised portions of said retainer base.

5. A coupling as claimed in claim 1, wherein there is one locking loop.

6. A coupling as claimed in claim 5, wherein said locking loop is attached to said base on one side of a central axis passing through said connector body, said locking loop cutting across said axis to engage said upset on an opposite side of said central axis.

7. A coupling as claimed in claim 1, wherein said retainer is stamped from a strip of sheet metal.

8. A coupling as claimed in claim 1, wherein said locking loop defines a locking wedge which engages said upset outside of said connector body.

9. A coupling as claimed in claim 8, wherein a reinforcement strip is attached to said locking wedge.

10. A coupling comprising:
 a hollow connector body; a tubular member received in one end of said connector body and defining an upset portion; and a retainer attached to said connector body and comprising a locking member, said locking member comprising two spaced legs extending outside of said connector body and being connected at leg ends remote from said connector body by a wedge spaced from said connector body, said upset portion being locked between said wedge and said connector body to secure said tubular member in said connector body, said locking member being attached to said connector body on one side of a central axis passing through said connector body and cutting across said axis to engage said upset portion with said wedge on an opposite side of said axis.

* * * * *